US006188401B1

(12) United States Patent
Peyer

(10) Patent No.: US 6,188,401 B1
(45) Date of Patent: Feb. 13, 2001

(54) SCRIPT-BASED USER INTERFACE IMPLEMENTATION DEFINING COMPONENTS USING A TEXT MARKUP LANGUAGE

(75) Inventor: Sven Peyer, Redmond, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/048,829

(22) Filed: Mar. 25, 1998

(51) Int. Cl.$^7$ ....................................... G06F 3/00
(52) U.S. Cl. ................ 345/335; 345/333; 345/339; 709/315; 709/328
(58) Field of Search ........................... 345/327, 333–335, 345/339, 348, 357; 707/104, 501, 513; 709/203, 217, 219, 302–303

(56) References Cited

U.S. PATENT DOCUMENTS

| 5,784,058 | * | 7/1998 | LaStrange et al. | 345/335 X |
| 5,793,368 | * | 8/1998 | Beer | 345/334 |
| 5,802,530 | * | 9/1998 | Van Hoff | 707/513 |
| 5,835,712 | * | 11/1998 | DuFresne | 709/203 |
| 5,838,906 | * | 11/1998 | Doyle et al. | 709/202 |
| 5,890,172 | * | 3/1999 | Borman et al. | 707/501 |
| 5,905,492 | * | 5/1999 | Straub et al. | 345/333 |

FOREIGN PATENT DOCUMENTS

| 0 622 729 A2 | 6/1994 | (EP) . |
| 0 810 536 A1 | 3/1997 | (EP) . |

OTHER PUBLICATIONS

"Microsoft Press Computer Dictionary", Microsoft Press, p. 269, 432, 1997.*
Laura Lemay, "teach yourself WEB Publishing with HTML 3.2", sams net, p. 387–389, 394–395, 1996.*
"Method to Convert Graphical User Interface Definitions and Widows to HyperText Markup Language," IBM Technical Disclosure Bulletin, vol. 40, No. 8, Aug. 1997.

* cited by examiner

Primary Examiner—Raymond J. Bayerl
Assistant Examiner—X. L. Bautista
(74) Attorney, Agent, or Firm—Lee & Hayes, PLLC

(57) ABSTRACT

A computer system as described herein comprises a first browser instance that displays and navigates hyperlinked browsable content. A global script, in the JavaScript language, is responsible for user interface functions. The global script includes event handlers that respond to identified events. A supervisory application program calls the event handlers in response to the defined events. In addition, the supervisory application program exposes methods that allow the global script to open and close dialogs that are specified as HTML files. Such dialogs are displayed in a second browser instance. The global script uses this capability to create appropriate user interface displays in response to system events.

23 Claims, 3 Drawing Sheets

SCRIPT-BASED USER INTERFACE IMPLEMENTATION DEFINING COMPONENTS USING A TEXT MARKUP LANGUAGE

TECHNICAL FIELD

The invention relates to systems and methods for implementing user interfaces in television-based systems that also provide Web browsing features.

BACKGROUND OF THE INVENTION

In areas relating to user input and output, personal computer hardware has become very standardized. As an example, most personal computers utilize keyboards having identical sets of keys that generate identical electrical signals. Computer mice are another example of this trend. Even where hardware is slightly different, as with video display monitors, most differences are handled transparently by driver software. As a result, developers of application programs can focus their efforts on higher levels of functionality rather than having to deal with the details of hardware interaction.

With the widespread use of graphical user interfaces such as the Windows is family of operating systems (sold by Microsoft Corporation), the details of user interaction have also become somewhat standardized. The Windows operating system allows developers to utilize pre-written software components to implement user controls and makes possible a unified "look and feel" across a wide range of applications.

These degrees of standardization have not yet been attained in other technological products that require complex user interaction, such as interactive television products and products that attempt to combine Internet Web browsing with traditional and enhanced television services. In these products, different manufacturers implement different types of input hardware (keyboards, mice, etc.) and wish to design and experiment with different methods of user interaction. Indeed, there is often an attempt by each manufacturer to implement a unique "look and feel," to differentiate a product from competing products.

This presents a problem for a company such as Microsoft Corporation that wants to design and sell a single software product such as an operating system and Web browser for use with products manufactured by different companies. The software product must adapt to different hardware for each manufacturer's product, and must also be customizable to implement each manufacturer's unique graphical user interface.

Normally, customizing a software product for each manufacturer is extremely inefficient from both production and maintenance standpoints. Although the manufacturers could conceivably be allowed to modify a software product's source code to implement a desired interface, this too involves maintenance problems. Furthermore, many such manufacturers are not equipped to perform computer programming at this level.

SUMMARY OF THE INVENTION

The invention utilizes an Internet Web browser architecture that allows the visual components of a user interface to be implemented through a combination of documents or source files written in conventional Internet hypertext formats. In particular, the user interface is implemented using individual HTML (hypertext markup language) components in conjunction with a global script written in a popular scripting language such as JavaScript.

The global script file is written so that it responds to user input and other events with conventional and extended JavaScript event handlers such as "onKeyDown", "onClick", etc. In response to user input, the global script file opens and displays appropriate HTML elements and responds to user selection of such elements. These elements can communicate with each other and with the global script using JavaScript methods and properties. The script file and HTML elements also interact with device hardware in response to defined events.

The invention utilizes a supervisory application program that runs under an operating system such as Windows CE. The application program implements an extended document object model for use by the global script and by scripts embedded in HTML control elements. The global script runs perpetually, under the supervision of the supervisory application program, as does one or more instances of a conventional Web browser.

The extended document object model includes methods relating to the creation and maintenance of user interface components, referred to above as HTML elements and also referred to herein as dialogs. These methods accept designations of local HTML files representing user controls. Such HTML files exist and are specified apart from informational content obtained as a result of browsing.

A particular HTML control can be opened either as a modal dialog or as a modeless dialog. The extended document object model methods allow the dialogs to be opened, closed, resized, moved, and closed. The dialogs act as conventional HTML components, potentially containing event handler scripts that respond to user input events and to other events, including custom events defined by OEMs in conjunction with their own hardware. The HTML controls have access to the extended document object model and to properties and methods implemented within the global script. In addition, the global script has access to methods and properties defined and exposed by script code within the HTML controls. Accordingly, the global script and the various HTML components can communicate and interact with each other to produce a full and flexible user interface.

Using this architecture, a software manufacturer can sell a single product such as a Web browser to many different manufacturers. As shipped, the product includes a default global script file and associated HTML controls, for implementing a default graphical user interface in conjunction with default hardware. However, the default global script file is easily modified or replaced by customers using well-known Web content creation tools rather than more complex high-level compiled languages such as C or C++. Thus, it is very easy for a customer to create an entirely new user interface, and to adapt it to new hardware, without disturbing more critical underlying aspects of the software product.

DETAILED DESCRIPTION

Internet Content—HTML and JavaScript

Figure 1:
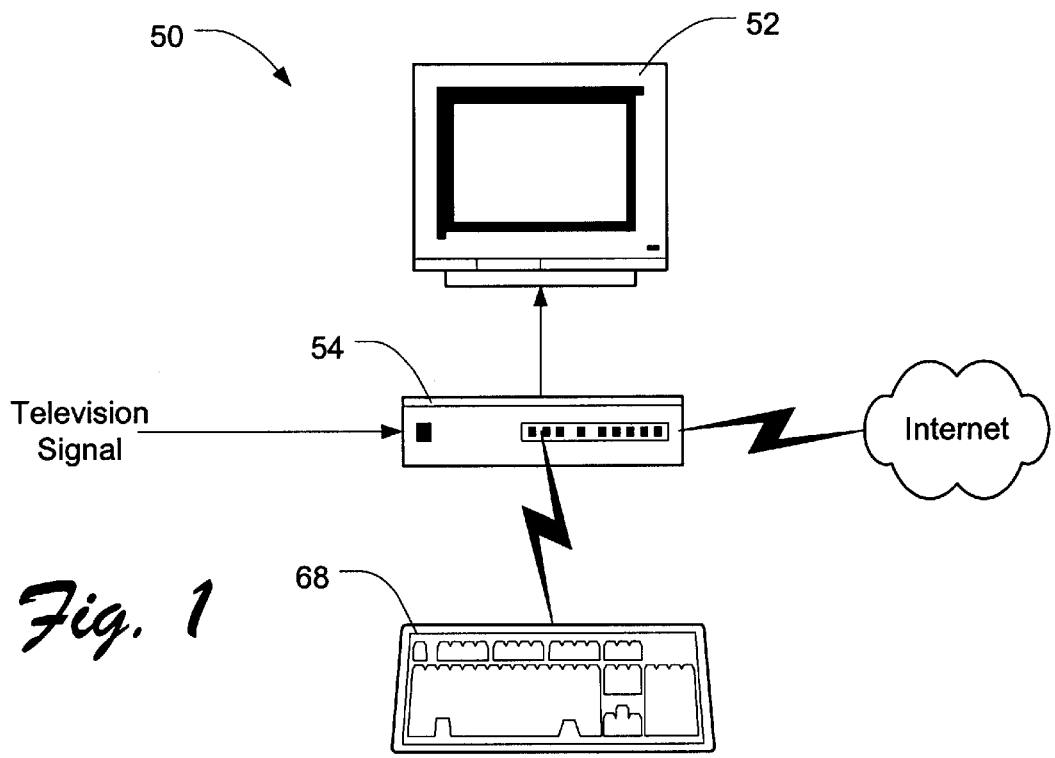
FIG. 1 illustrates a television-based system that incorporates Web browsing features.

The World Wide Web (WWW or Web) of the Internet is a body of multimedia content referred to as "hypermedia."

"Hypermedia" is a metaphor for information in which text, images, sounds, and actions are linked together in a complex, non-sequential web of associations that permit a user to "browse" or "navigate" through related topics, regardless of the presented order of the topics. The term "hypermedia" arises from "hypertext," a term which was originally coined to describe text-based documents including links to other such documents to form a non-sequential web of associated ideas.

Hypermedia content is commonly organized as individual "documents" or "pages" with embedded control information. A document or page normally corresponds to a single file that is retrievable either locally or through a network. The embedded control information includes formatting specifications, indicating how a document is to be rendered. In addition, such control information can include links or "hyperlinks": symbols or instructions indicating where to find other related Web documents (files) on the Internet. A hyperlink from one hypermedia topic to another is normally established by the author of a hypermedia document, although some applications allow users to insert hyperlinks to desired topics.

An application program referred to as a Web browser is used to retrieve and render hypermedia content from the WWW. A Web browser allows a user to browse or navigate through the Web and to thereby find items of specific interest to the user. The terms "browse" and "navigate" indicate a process of following a sequence of hyperlinks through a plurality of different documents or other Web resources.

In response to activation or selection of a particular hyperlink, a Web browser loads and renders the file or other multimedia content specified by the hyperlink. In accordance with conventional practice, such content typically contains hyperlinks to additional media resources (thus creating the "web" of inter-linked documents or resources). A user can select any such hyperlink and in response the viewing software will load the media resources identified by that hyperlink.

A hyperlink is typically rendered by a Web browser as a graphical icon or as highlighted keywords. A user "activates" or "follows" a hyperlink by clicking on or otherwise selecting the icon or highlighted keywords. Activating a link causes the Web browser to retrieve and render the document or resource that is targeted by the hyperlink. The target of the hyperlink is specified in the document containing the hyperlink.

In concept, the target of a hyperlink can be virtually any type of object—including executable programs, text or multimedia documents, sound clips, audio segments, still images, computers, directories, and other hyperlinks. In WWW documents, hyperlink targets are most often files that can reside on any computers connected to the Internet. However, a hyperlink target can also be a particular location within a document, including the document that is currently being rendered.

Hypermedia content utilized by the WWW is commonly written using what is referred to as a "text markup language." "SGML" (Standard Generalized Markup Language) is one such language, defined formally as "a language for document representation that formalizes markup and frees it of system and processing dependencies." SGML is a language for describing the structure of documents and for describing a tagging scheme to delineate that structure within text.

For creating hypermedia content, WWW documents utilize a specialization of SGML called "HTML" (Hypertext Markup Language). An HTML textual document can be thought of as plain text that contains formatting instructions in the form of HTML markup codes or "tags." Tags tell Web browsers how to render and print documents, and are also used to specify hyperlinks.

The primary purpose of HTML is to lay out and format text and images. However, HTML documents can also include executable scripts. A script is a sequence of instructions that potentially include logical decisions, looping, and conditional looping. Scripts are often interpreted at the time of execution rather than being compiled.

JavaScript is an example of a currently popular scripting language. JavaScript allows a designer to add interactivity to HTML, to allow for user interaction and feedback, multimedia and animation, and to link HTML to other technologies such as Java, ActiveX, and plug-ins.

To allow interactivity, JavaScript uses so-called "event handlers." With an event handler, a JavaScript can capture events that occur on a hypermedia document, such as the clicking of a form button or the mouse moving over a link. The event handler can then execute code in response to these actions. As an example, a JavaScript can contain an "onClick" event handler. If the event handler is associated with a button or some other discrete HTML component, clicking on that component will cause execution of the "onClick" event handler.

JavaScript uses what is referred to as a "document object model." This is a hierarchy of objects and their properties and methods. Through such properties and methods, a script can access and specify aspects of the Web browser itself, such as status lines, window positions and characteristics, date and time values, and a host of other features. A JavaScript can also expose its own properties and methods for use by other JavaScript components.

For additional details regarding HTML and JavaScript, refer to R. Stout, *The World Wide Web Complete Reference*, (Berkeley: Osborne McGraw-Hill, 1996) and N. Heinle, *Designing with JavaScript: Creating Dynamic Web Pages*, (Sebastopol: Songline Studios, 1997), which are hereby incorporated by reference. The following discussion assumes some familiarity with these topics.

Hardware Environment

The invention is described in the environment of a television-based computer with Internet connectivity that has come to be referred to generically as a "Web television" or an "Internet television." Devices such as this can be constructed in a variety of configurations, such as standalone TVs, as system or set-top boxes that are to be used in conjunction with TVs, or as more traditional computers with television viewing capabilities. These devices combine the network browsing functions of a computer with the television viewing capabilities of traditional televisions. In addition, so-called Internet televisions provide enhanced functionality like interactive programming guides and the linking of hyperlinked Web content to television content.

FIG. 1 shows one example of television-based computer or browser system 50 within which the invention can be implemented. In this case, the system comprises a conventional television receiver 52 and a system or set-top box 54. Television receiver or display 52 is connected to receive a video/audio signal from system box 54. A keyboard 68 is connected to the keyboard input port of system box 54, preferably by way of a wireless infrared connection. The system box has a connection to the Internet and receives a television signal from a terrestrial source, from a satellite, or from a cable television system.

Figure 2:
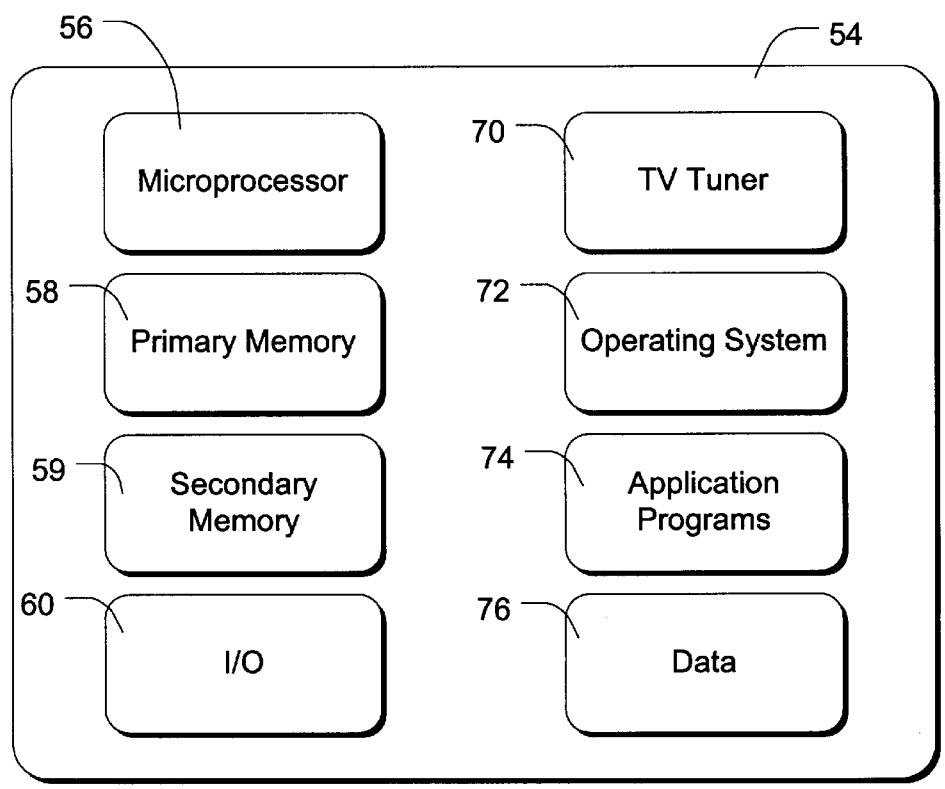
FIG. 2 is a block diagram of a system box.

FIG. 2 shows the most pertinent components of system box 54. System box 54 is essentially a computer, having a data processor or microprocessor 56, primary memory 58 including volatile and non-volatile memory, optional secondary memory 59 such as a hard disk, floppy disk, or other removable media, various I/O components 60, and other components as are common in personal computers. The pertinent I/O components include a keyboard input port, a video/audio output port, a network interface, and a television signal input port. The network interface connects to a private or public network such as the Internet. The network interface might comprise a telephone-line modem, an Ethernet interface, or some analogous interface. System box 54 also has a television tuner 70 for receiving and demodulating traditional television signals.

Software Architecture

The microprocessor of system box 54 is programmed by means of programs and instructions stored at different times in the different computer-readable storage media of the system box. Programs are typically distributed, for example, on floppy disks or CD-ROMs. From there, they are installed or loaded into the secondary memory of a computer. At execution, they are loaded at least partially into the computer's primary electronic memory. The invention described herein includes these various types of computer-readable storage media when such media contain instructions or programs for implementing the described steps in conjunction with a microprocessor or other data processor. The invention also includes the system or computer itself when programmed according to the methods and techniques described below.

In the specific embodiment described, programs are stored in and executed directly from non-volatile ROM.

As shown in FIG. 2, the system includes an operating system 72, one or more application programs 74, and program data 76. For purposes of illustration, programs, program components, and data are shown in FIG. 2 as discrete blocks within system box 54, although it is recognized that such programs and components reside at various times in different storage components of the computer-based system.

The operating system is preferably a multitasking operating system such as the Windows CE operating system sold by Microsoft Corporation. The operating system employs a graphical user interface in a windowing environment.

In the described embodiment of the invention, the operating system is not the component that is most visible to a user. Rather, a supervisory computer application program supervises and manages most of the apparent functionality of system 50, such as network browsing, video or television viewing capabilities, and user interface functions. The supervisory application program is configured to startup automatically whenever system 50 is turned on and used.

Figure 3:
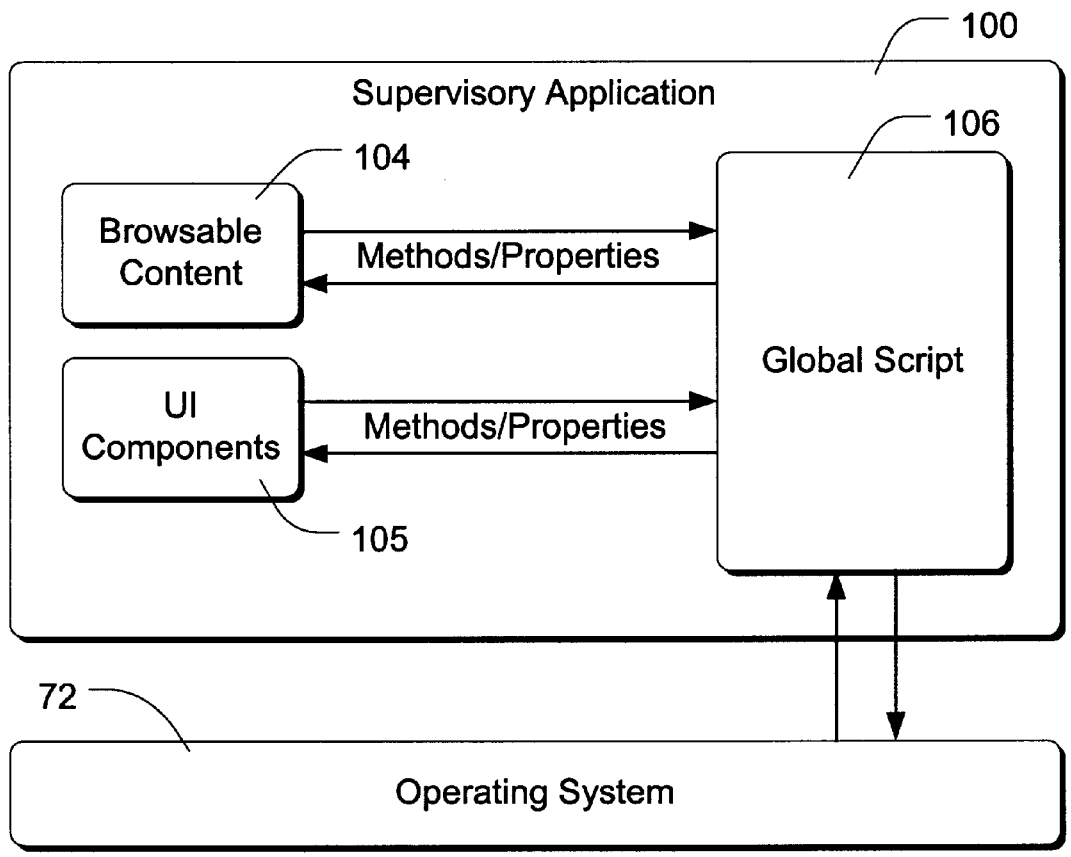
FIG. 3 shows software components.

FIG. 3 shows such a supervisory application, generally referenced by numeral 100. The application is written in a conventional compiled programming language using well-known Windows programming techniques. Application program 100 runs in conjunction with operating system 72, also shown in FIG. 3. Supervisory application 100 communicates with hardware devices such as the network interface television tuner, keyboard, and display components through conventional Windows operating system calls. In addition, the operating system provides other services in accordance as are commonly provided by modem operating systems.

Applications 74 include a browser program 104 that is actually one or more instances of the Microsoft Web Browser ActiveX control, available as part of Microsoft's INET Software Developer's Kit. This ActiveX control is a fully functional network hyperlink browser, with capabilities such as those found in Microsoft's Internet Explorer program. It allows a user to browse or navigate through the WWW of the Internet or any similar resources. In this case, however, browser instances are configured to execute without their normal user interface components. User interface components 105 are rendered as HTML content separately from the browsable content, as will be described in more detail below, in a separate browser instance.

Thus, supervisory application 100 runs on top of windows CE and hosts one or more instances of a browser program that displays browsable content. As will be described in more detail below, the supervisory application also extends the standard object model used by JavaScript and provides event brokering services.

Particular Web resources can be specified by direct user entry, by selecting a hyperlink, by other application programs through standard program interfaces, or by scripts contained in Web content itself In most cases, a newly-specified resource will replace the previously rendered content. However, it is also possible for new content to be opened in a new window, partially overlying the original window.

Specified resources can also include ActiveX components or controls. An ActiveX control is an executable program in the form of a DLL (dynamically linked library). ActiveX controls can be downloaded as Web content or obtained locally. ActiveX components optionally expose methods and properties that can be used by scripts associated with Web content. Television or video content is preferably viewed in an ActiveX control. Such a control uses its own browser instance, and runs as a window on top of any other content.

User Interface Example

Figure 4:
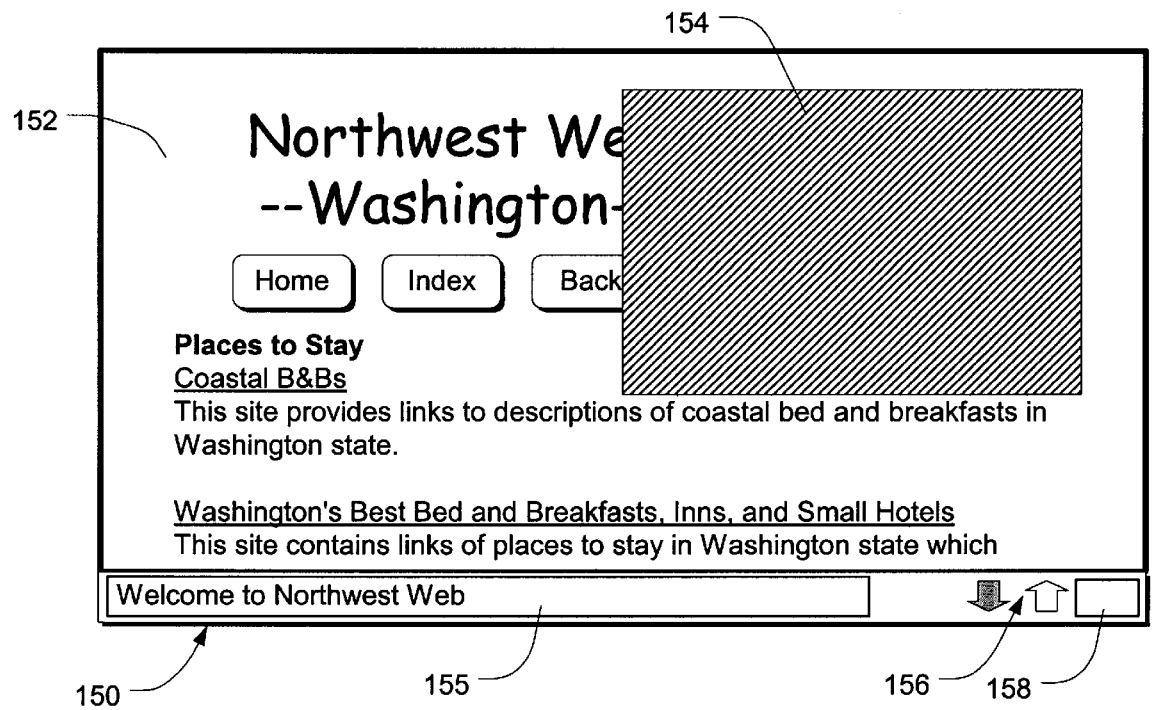
FIG. 4 shows a browser window and its components.

FIG. 4 shows an example of how a system might be configured to allow Web viewing and access while also allowing the user to simultaneously watch live television. The visual configuration includes three primary components: a user interface component 150, an Internet content window 152, and live television window 154. All three components are implemented as browser instances.

The Internet component 152 renders Internet Web content. Within this component, the user can move a focus from link to link, scroll the rendered content, and navigate to new destinations, all in accordance with conventional browsing technology.

The television component 154 displays a live video stream. In this example, this component is displayed in a dedicated window, which is overlaid with the Internet content component. This component does not receive focus or expose any visual components other than the video stream. The television component utilizes an ActiveX control to communicate with TV-tuner hardware which might vary between systems. This control exposes a set of methods and properties to allow scripts to access TV specific functionality and information.

In FIG. 4, user interface component 150 is shown in a default, minimized state. In this state, the user interface component gives only informational feedback. In this example it displays a variable message in a description area 155, a pair of scroll indicators 156, and a connection status area 158.

Figure 5:
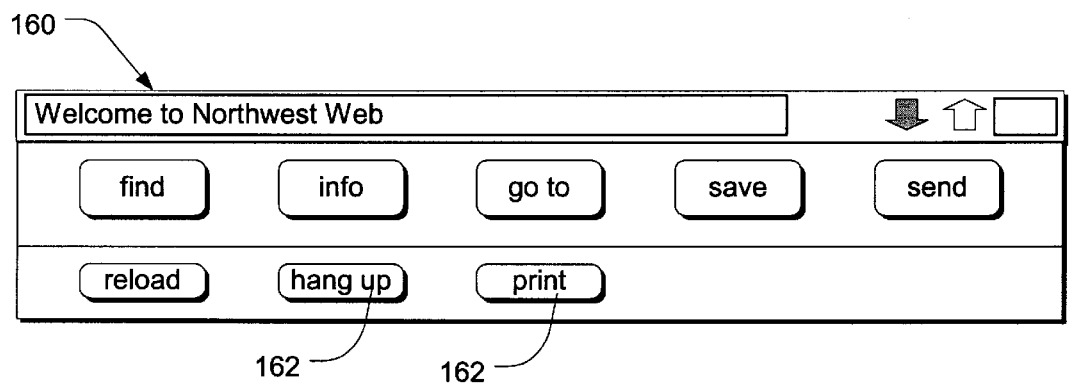
FIG. 5 shows an expanded user dialog.

In order to access specific functionality of system 50, the user can activate and expand the displayed user interface component 150 by pressing an assigned key on a remote control or keyboard. The result is shown in FIG. 5: an expanded toolbar 160 containing a plurality of menu items graphically presented as buttons 162. A user can select any of these buttons to perform the indicated functions.

Implementation of the User Interface

The user interface components shown in FIGS. 4 and 5 are only examples of the many different types of user interface components that might be implemented in conjunction with a television-based Web device such as described herein. As will be apparent to many, the possibilities are endless and the need for flexibility is great.

To provide such flexibility in implementing the user interface portion of the device, all functions and components relating to the user interface are implemented using technology that is widely used in conjunction with Internet content. Specifically, user interface controls and dialogs are implemented as HTML files or resources. Furthermore, the overall logic and sequence of the user interface is established by a global script file written in a scripting language such as JavaScript. The script file is specified at run-time, and can be replaced or re-specified during execution to implement different modes of operation. Such a script file is shown in FIG. 3, referenced by numeral 106.

Script 106 is a JavaScript program designed and configured to implement the user interface of system 50. It contains JavaScript event handlers for execution in response to different events such as user input, browser activities, and a variety of other events that are defined both by supervisory application 100 and by custom ActiveX controls loaded by browsed documents and by the global script file itself. Application program 100 invokes the event handlers in response to defined events. In turn, event handlers and other code within global script 106 can invoke functions or methods provided by application program 100. These functions are invoked through an extended document object model implemented by application program 100.

Controls and dialogs themselves are implemented as text and graphics documents written in a text markup language such as HTML. In order to present options to a user, global script 106 generates dialog boxes and controls by specifying local HTML graphical elements (in the form of HTML files and their URLs) to supervisory application 100. Supervisory application 100 passes such the specifications to a browser instance, which displays the specified HTML graphical elements in conjunction with whatever material is already being displayed as a result of user browsing.

The supervisory application program 100 implements an extended document object model for utilization by the global script 106 and by script code within the HTML graphical elements that are specified as user interface components. The extended document object model includes methods relating to the creation and maintenance of user interface graphical elements, which are also referred to as dialogs. These methods accept designations of local HTML files representing user controls.

A particular HTML component or control can be opened either as a modal dialog or as a modeless dialog. The extended document object model methods allow the dialogs to be opened, resized, moved, and closed. When open, the dialogs act as conventional HTML components, potentially containing event handler scripts that respond to user input and other events. The HTML controls themselves have access to the extended document object model and to properties and methods implemented within the global script. In addition, the global script has access to methods and properties defined by script code within the HTML controls. Accordingly, the global script and the various HTML components can communicate and interact with each other to produce a full and flexible user interface.

Extended Object Model

In order to implement the functionality described above, application program 100 supports an extended document object model that is accessible through JavaScript scripts such as the global script and scripts embedded in HTML controls.

Generally, the following syntax is used to access UI-related methods and properties in this extended model:
Window.external.app.method( )
Window.external.app.property( )
Window.external.dialog.method( )
Window.external.dialog.property( ).

The following tables list the pertinent methods and properties related to user interface components:

| | Description |
|---|---|
| App Methods and properties | |
| ExecuteNewScript([in] BSTR script) | ExecuteNewScript(scriptname path and filename) Load a new global script. Closes current script. |
| ExecuteScript(path, vars) | ExecuteScript( ) Executes a new global script. Does not unload current script. |
| CloseScript( ) | Closes the current global script. |
| ShowModalDialog(string URL,int x, int y, int dx, int dy, 0,0,VARIANT_BOOL DisallowClose) | Displays a modal dialog of the specified size at the specified location. The URL can be a local pathname. |
| ShowModelessDialog(string URL, int x, int y, int dx, int dy, 0,0) | Var idDialog = ShowModelessDialog( . . . ) Displays a modeless dialog of the specified size at the specified location. The URL can be a local pathname. |
| CloseModelessDialog(name) | CloseModelessDialog(idDialog) Closes the dialog with the ID passed |
| CloseAllModalDialogs( ) | Closes all the modal dialogs. |
| Dialog Methods and properties | |
| Document | Property. Allows access to document properties of the dialog. |
| Window | Property. Allows access to window properties/methods of dialog. |
| SetFocus(void); | Sets focus to the dialog. |
| Show(void); | Shows the dialog. |
| Hide(void); | Hides the dialog. |
| Position(short x, short y, short w, short h); | Set the position of the dialog. |
| IsVisible([out, retval] BOOL* pfVisible); | Get/Set visibility of the dialog. |

The primary methods that the global script uses to generate user interface components are the ShowModalDialog( ), ShowModelessDialog( ), CloseModalDialog( ), and CloseModelessDialog( ) methods, referred to herein as "open" and "close" interface methods.

Scripts within specified HTML components can access methods and properties of the global script by using the following syntax, where method( ) and property are replaced by the names of the methods and properties exposed by the global script:
Window.external.script.method( ) Window.external-.script.property.

The standard object model is also extended by defining additional events, corresponding to potential event handlers implemented by global script 106. The following table shows events that may be generated by application program 100 for potential handling by global script 106:

| Event | Behavior |
| --- | --- |
| OnStart | Generated when application program 100 starts |
| OnClose | Generated when application program 100 stops |
| OnBrowserDocLoaded | Generated when the main browser loads a document. |
| OnBrowserTitleChange(BSTR) | Generated when the current browser title changes. |
| OnBrowserBeforeNavigate( ) | Generated when the browser is about to attempt a navigate. |
| OnBrowserNavigateComplete( ) | Generated when the browser has completed the navigate. |
| OnBrowserDownloadBegin( ) | Generated when the browser begins a download. |
| OnBrowserDownloadComplete( ) | Generated when the browser completes a download |
| OnOpenSoftKeyboard( ) | Generated when the user invokes a on-screen keyboard |
| OnCloseSoftKeyboard( ) | Generated when the on-screen keyboard is closed |
| OnDialogOpen( ) | Generated when a dialog is opened |
| OnDialogClose( ) | Generated when a dialog is closed |
| OnRasDialStatus(int) | Generated when the RAS connect status changes |
| OnPlayAudio | Generated when audio rendering starts |

In addition, keyboard events are defined for certain default keyboard configurations. As an example, a "MenuKey" event might be defined for a dedicated keyboard key labeled "Menu". Hardware manufacturers can register additional keyboard key events by registering keycodes in the system registry.

In systems having unique hardware that is not described by the default configuration, an ActiveX control can be prepared and loaded as a non-visible part of a persistent dialog. Such an ActiveX control exposes methods and properties that allow the global script to access features of the unique hardware.

EXAMPLES

The following is an example of JavaScript code for creating a new dialog and then working with its methods. This code could be implemented as part of an event handler in the global script, for instance to create a new user interface component in response to a user pressing a specific key.

Toolbar=Window.external.UI.showModelessDialog
      ("Toolbar.htm", 0, 0, 0, 0);
   Window.external.Dialog.Document(Toolbar)
      .all.TitleText.innerText="WebTV";
   Window.external.Dialog.Window(Toolbar).scrollTo(0, 0);
   Window.external.Dialog.Position(Toolbar, PosX, PosY, Width, Height);
   Window.external.Dialog.SetFocus(Toolbar);
   Window.external.UI.closeModelessDialog(Toolbar);

The following is an example of an HTML resource that implements a TVTuner component:

CONTENT.HTML <OBJECT width=224px height=176px ID=TVTuner style="position:absolute; LEFT: 60px; TOP: 244px; WIDTH: 224px; HEIGHT: 176px" CLASSID="clsid:32F4F485-7F80-11 D0-B835-00A0C911837F"></OBJECT>

When rendered, this resource displays an ActiveX TVTuner control as specified by the class identifier (CLASSID). Assuming that this HTML text is in a file called "tuner.htm", the global script could open the control with the following JavaScript statement:

TVWindow=Window.external.UI.showModelessDialog
      ("tuner.htm", PosX, PosY, Width, Height);

A statement such as this could be part of an event handler that opens a TV viewing window in response to a user pressing a specific key. The resulting TVTuner control exposes methods and properties that are accessible from scripts. As an example, the following JavaScript statement sets a variable named "channel" to the value of the current channel number:

channel=
      browser.document.all.TVTuner.CurrentChannel( );

The following JavaScript statement sets the channel to the value contained in variable "channel":

browser.document.all.TVTuner.CurrentChannel=
      (channel);

Suppose that the extended document object model includes a definition for an event named "OnChannelUp" that takes place when a user presses a key labeled "Channel Up". The following JavaScript code is an event handler for this event that changes the channel to the next channel:

Function OnChannelUp( )
   {channel=
      browser.document.all.TVTuner.CurrentChannel( );
   browser.document.all.TVTuner.CurrentChannel=
      (channel+1);}

In accordance with the invention, the global script contains numerous event handlers such as this to both control hardware and to display appropriate graphic elements. In addition, the global script contains whatever logic is necessary to control the interaction of displayed controls with underlying hardware.

Communicating with OEM-Specific Hardware and Software

The extended document object model of application program 100 does not provide explicit methods for communicating with OEM-specific hardware or software. When functionality of this kind is required, the global script should be configured to open a specific ActiveX control that is aware of the hardware or software and that exposes the needed methods and/or interfaces for dealing with the hardware or software. This ActiveX control can be used as bridge (generating events if necessary to the global script code) between the OEM hardware of software and the global script.

Conclusion

The described architecture provides a very flexible way of implementing a user interface, which allows individual hardware manufacturers to customize the user interface in an infinite number of ways. The architecture is also advantageous to the software manufacturer, since a single software product can be marketed to various hardware manufacturers. Customizations are implemented using Web-based techniques that are well within the capabilities of most companies.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer program stored on one or more computer-readable storage media, the program comprising:

a hyperlink browser that displays and navigates hyperlinked browsable content from a network;

a plurality of graphical user interface components that are independent of the hyperlinked browsable content, each graphical user interface component comprising a document written in a text markup language;

a global script file that is specified to the computer program during execution of the computer program;

an open interface method that is callable from the global script file during execution of the computer program to render a specified one of the graphical user interface components in conjunction with the hyperlinked browsable content;

a close interface method that is callable from the global script file during execution of the computer program to close said specified one of the graphical user interface components;

wherein the global script file and the graphical user interface components expose methods and properties;

wherein the global script file can access the methods and properties exposed by the graphical user interface components; and the graphical user interface components can access the methods and properties exposed by the global script file.

2. A computer program as recited in claim 1, wherein the graphical user interface components are specified to the open interface as uniform resource locators.

3. A computer program as recited in claim 1, wherein the graphical user interface components are specified to the open interface as file specifications.

4. A computer program as recited in claim 1, wherein at least one of the graphical user interface components includes a script.

5. A computer program as recited in claim 1, wherein:

the computer program calls event handlers of the script file in response to defined events;

the event handlers of the script file call the open and close interfaces to manage graphical user interface components.

6. A computer program as recited in claim 1, further comprising:

wherein the script file includes a plurality of event handlers;

wherein the computer program calls the event handlers in response to defined events; and wherein the event handlers call the open and close interface methods to designate user interface components for rendering in conjunction with the hyperlinked browsable content.

7. A computer program as recited in claim 1, further comprising:

the script file comprising a plurality of event handlers;

wherein the computer program calls the event handlers in response to defined events; and wherein the event handlers call the open and close interface methods to designate user interface components for rendering in conjunction with the hyperlinked browsable content.

8. A method of implementing a user interface in conjunction with hyperlinked browsable information content from a network, the method comprising:

executing a first browser instance to display and navigate hyperlinked browsable content;

executing a global script that is responsible for user interface functions, wherein the global script includes event handlers;

calling event handlers of the global script in response to defined events;

the event handlers specifying graphical user interface components, wherein each graphical user interface component comprises a document written in a text markup language;

executing a second browser instance to display the graphical user interface components in response to calls from the global scripts;

exposing methods and properties from the global script file and the graphical user interface components;

accessing the methods and properties of the graphical user interface components from the global script; and accessing the methods and properties of the global script file from the graphical user interface components.

9. A method as recited in claim 8, wherein the global script is written in the JavaScript language.

10. A method as recited in claim 8, wherein the graphical user interface components are written in a form of SGML.

11. A method as recited in claim 8, wherein the graphical user interface components are written in a form of HTML.

12. A method as recited in claim 8, wherein the graphical user interface components are specified as uniform resource locators.

13. A method as recited in claim 8, wherein the graphical user interface components are specified as file specifications.

14. A method as recited in claim 8, wherein at least one of the graphical user interface components includes a script.

15. A computer-readable storage medium containing instructions for performing the method recited in claim 8.

16. A computer system comprising:

one or more data processors;

a first browser instance that displays and navigates hyperlinked browsable content, wherein the one or more data processors execute the first browser instance;

a global script that is responsible for user interface functions, wherein the global script includes event handlers, and wherein the one or more data processors execute the global script;

a supervisory application program that calls event handlers of the global script in response to defined events, wherein the one or more data processors execute the supervisory application program;

a plurality of graphical user interface components comprising documents written in a text markup language;

wherein the global script calls the supervisory application program to display selected ones of the graphical user interface components in response to the defined events;

a second browser instance that displays the graphical user interface components in response to calls from the global script, wherein the one or more data processors execute the second browser instance;

the global script and the graphical user interface components exposes methods and properties;

the global script can access the methods and properties of the graphical user interface components; and the graphical user interface components can access the methods and properties of the global script.

17. A computer system as recited in claim 16, wherein the global script specifies the graphical user interface components as uniform resource locators.

18. A computer system as recited in claim 16, wherein the global script specifies the graphical user interface components as file specifications.

19. A computer system as recited in claim 16, wherein at least one of the graphical user interface components includes a script.

20. A computer system as recited in claim 16, wherein the global script is written in the JavaScript language.

21. A computer system as recited in claim 16, wherein the graphical user interface components are written in a form of SGML.

22. A computer system as recited in claim 16, wherein the graphical user interface components are written in a form of HTML.

23. A computer-readable storage medium containing instructions for implementing a user interface in conjunction with hyperlinked browsable information content from a network, the instructions being executable by a computer to perform steps comprising:

executing a first browser instance to display and navigate hyperlinked browsable content;

executing a global script that is responsible for user interface functions, wherein the global script includes event handlers and exposes methods;

calling event handlers of the global script in response to defined events;

the global script specifying graphical user interface components in response to the defined events, wherein each graphical user interface component comprises a document written in a text markup language, and wherein at least some of the graphical user interface components exposes a method;

executing a second browser instance to display the graphical user interface components in response to calls from the global script;

accessing the methods of the global script from the graphical user interface components;

accessing the methods of the graphical user interface components from the global script.

\* \* \* \* \*

UNITED STATES PATENT AND TRADEMARK OFFICE
CERTIFICATE OF CORRECTION

PATENT NO. : 6,188,401 B1
DATED : February 13, 2001
INVENTOR(S) : Sven Pleyer et al.

It is certified that error appears in the above-identified patent and that said Letters Patent is hereby corrected as shown below:

<u>Title page,</u>
Item [12] United States Patent, change "Peyer" to -- Pleyer --.
Item [75] Inventor, change "Sven Peyer" to -- Sven Pleyer --.

<u>Column 1,</u>
Line 25, delete "is" after "Windows".

<u>Column 5,</u>
Line 65, change "modem" to -- modern --.

Signed and Sealed this

Sixteenth Day of October, 2001

Attest:

*Nicholas P. Godici*

NICHOLAS P. GODICI
*Attesting Officer*     *Acting Director of the United States Patent and Trademark Office*